(No Model.)

J. T. TRENCH.
PNEUMATIC TIRED WHEEL.

No. 602,671. Patented Apr. 19, 1898.

WITNESSES.

INVENTOR.
John Townsend Trench.

Attorney.

THE NORRIS PETERS CO., PHOTO-LITHO., WASHINGTON, D. C.

UNITED STATES PATENT OFFICE.

JOHN TOWNSEND TRENCH, OF KENMARE, IRELAND.

PNEUMATIC-TIRED WHEEL.

SPECIFICATION forming part of Letters Patent No. 602,671, dated April 19, 1898.

Application filed December 20, 1897. Serial No. 662,610. (No model.) Patented in England November 13, 1896, No. 25,583.

*To all whom it may concern:*

Be it known that I, JOHN TOWNSEND TRENCH, a subject of the Queen of Great Britain, residing at Kenmare, county of Kerry, Ireland, have invented a new and useful Improvement in Pneumatic-Tired Wheels, (for which I have obtained a patent in Great Britain, No. 25,583, bearing date the 13th day of November, 1896,) of which the following is a specification.

This invention relates to pneumatic tires of the tubeless type, having internal radially-arranged sealing-lips, and to wheel-rims therefor; and it consists of certain improvements, hereinafter more particularly specified, which have for their object rendering such tires more perfect and more easy to manipulate.

In this type of tubeless pneumatic tire some difficulty has been found to exist in mounting the last edge of the tire in the wheel-rim, so that the sealing-lips come together in a proper manner to form an air-tight joint, by reason of the first edge of the tire mounted in the wheel-rim slipping toward the center of the groove of the rim instead of remaining at its own side thereof.

Figure 1:
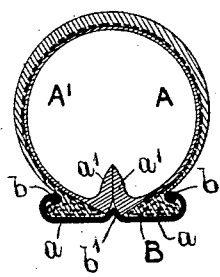
Figure 2:
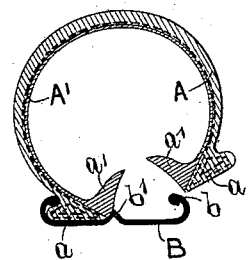
Figure 6:
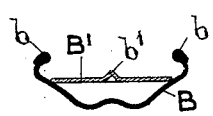
Figure 7:
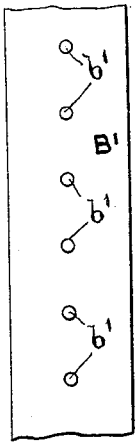
Figure 3:
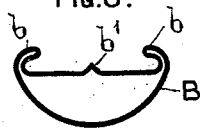
Figure 8:
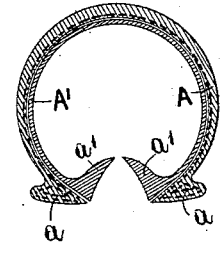
Figure 4:
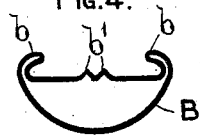
Figure 5:
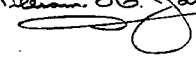
Figure 5:
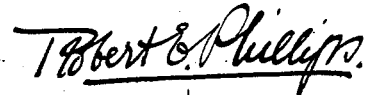

In the accompanying drawings, which illustrate my invention, Figure 1 is a view in transverse section of a tire seated in the wheel-rim. Fig. 2 is a similar view showing one edge of the tire dismounted from the rim. Fig. 3 is a view in transverse section of the wheel-rim. Figs. 4 and 5 are similar views showing modifications of the wheel-rim. Fig. 6 is a view in transverse section showing how an existing wheel-rim may be converted by the use of a band. Fig. 7 is a broken view in plan of the band, and Fig. 8 is a view in transverse section illustrating the construction of the tire.

Throughout the views similar parts are marked with like letters of reference.

The tire consists of an outer or wearing part A and an inner or lining part A'. The outer part A is made of rubber reinforced with fabric in the well-known manner and has circumferentially-arranged beads or enlargements $a$ at or near its edges. The inner or lining part A' is made of pure rubber, and it has internal circumferentially-arranged radial lips $a'$ at each edge, the said lips being of a cone shape in cross-section and having their edges sloped or inclined outward, as shown by Figs. 2 and 3, so that they impinge one on the other when the tire is mounted in the wheel-rim. Both the part A and the part A' are made and vulcanized independently and are subsequently attached the one to the other by means of rubber cement or its equivalent. By this construction the tire becomes quite air-proof and does not have that porosity which is inseparable from single-tube tire made and vulcanized as a whole.

The bottom of the groove in the wheel-rim B, which has the usual inturned edges $b$, is made flat, or approximately so, and it has a central circumferential ridge $b'$, as shown in Figs. 1, 2, and 3, so as to divide the groove of the rim into two parts, each adapted to receive and hold one of the edges of the tire. As an alternative construction the bottom of the groove of the rim B may be made of a convex shape, forming an enlarged ridge $b'$, as shown in Fig. 5, which attains the same end, as the edges of the tire, owing to their elasticity, endeavor to seat themselves in that part of the groove of the rim of the smallest diameter and are thus automatically kept close up to the edges of the rim and have no tendency to work toward the center thereof. As a further modification more than one circumferential ridge may be made in the groove of the rim, as shown in Fig. 4. To convert rims already made, I mount in the groove of the rim a band B', having a circumferential ridge or its equivalent, and a series of projections $b'$, as shown in Figs. 6 and 7.

Having now described my invention, what I claim is—

1. In a pneumatic-tired wheel, the combination with a tubeless tire consisting of an outer or wearing part A having circumferential beads or enlargements $a\ a$ at its edges and of an inner or lining part A' having internal circumferentially-arranged radial lips $a'\ a'$; of a wheel-rim B having inturned edges $b\ b$ and a groove having a flat or approximately flat bottom and one or more circumferentially-arranged ridges $b'$, as and for the purpose set forth.

2. In a pneumatic-tired wheel, the combination with a tubeless tire consisting of an outer or wearing part A having circumferential beads or enlargements $a\ a$ at its edges and of an inner or lining part A' having internal circumferentially-arranged radial lips $a'$ $a'$; of a wheel-rim B having inturned edges $b$ $b$ and a groove with a convex-shaped bottom forming a central ridge $b'$, as and for the purpose set forth.

3. In a pneumatic-tired wheel, the combination of a tubeless tire consisting of an outer or wearing part A having circumferential beads or enlargements $a$ $a$ at its edges and of an inner or lining part A' having internal circumferentially-arranged radial lips $a'$ $a'$, the two parts A and A' being vulcanized separately and subsequently made integral by cementation, and of a wheel-rim B having inturned edges $b$ $b$ and a groove having a flat or approximately flat bottom and one or more circumferentially-arranged ridges $b'$, as and for the purpose set forth.

4. In a pneumatic-tired wheel, the combination of a tubeless tire consisting of an outer or wearing part A having circumferential beads or enlargements $a$ $a$ at its edges and of an inner or lining part A' having internal circumferentially-arranged radial lips $a'$ $a'$ the two parts A and A' being vulcanized separately and subsequently made integral by cementation, and of a wheel-rim B having inturned edges $b$ $b$ and a groove with a convex-shaped bottom forming a central ridge $b'$, as and for the purpose set forth.

5. In a pneumatic-tired wheel, the combination with a tubeless tire consisting of an outer or wearing part A having circumferential beads or enlargements $a$ $a$ at its edges and of an inner or lining part A' having internal circumferentially-arranged radial lips $a'$ $a'$, of a wheel-rim B having inturned edges $b$, and of a band B having a centrally-arranged circumferential ridge $b'$ or its equivalents and so mounted in the wheel-rim as to give to its groove a flat or approximately flat bottom, as and for the purpose set forth.

JOHN TOWNSEND TRENCH.

Witnesses:
 WILLIAM H. JONES,
 ALFRED K. CROOD.